UNITED STATES PATENT OFFICE.

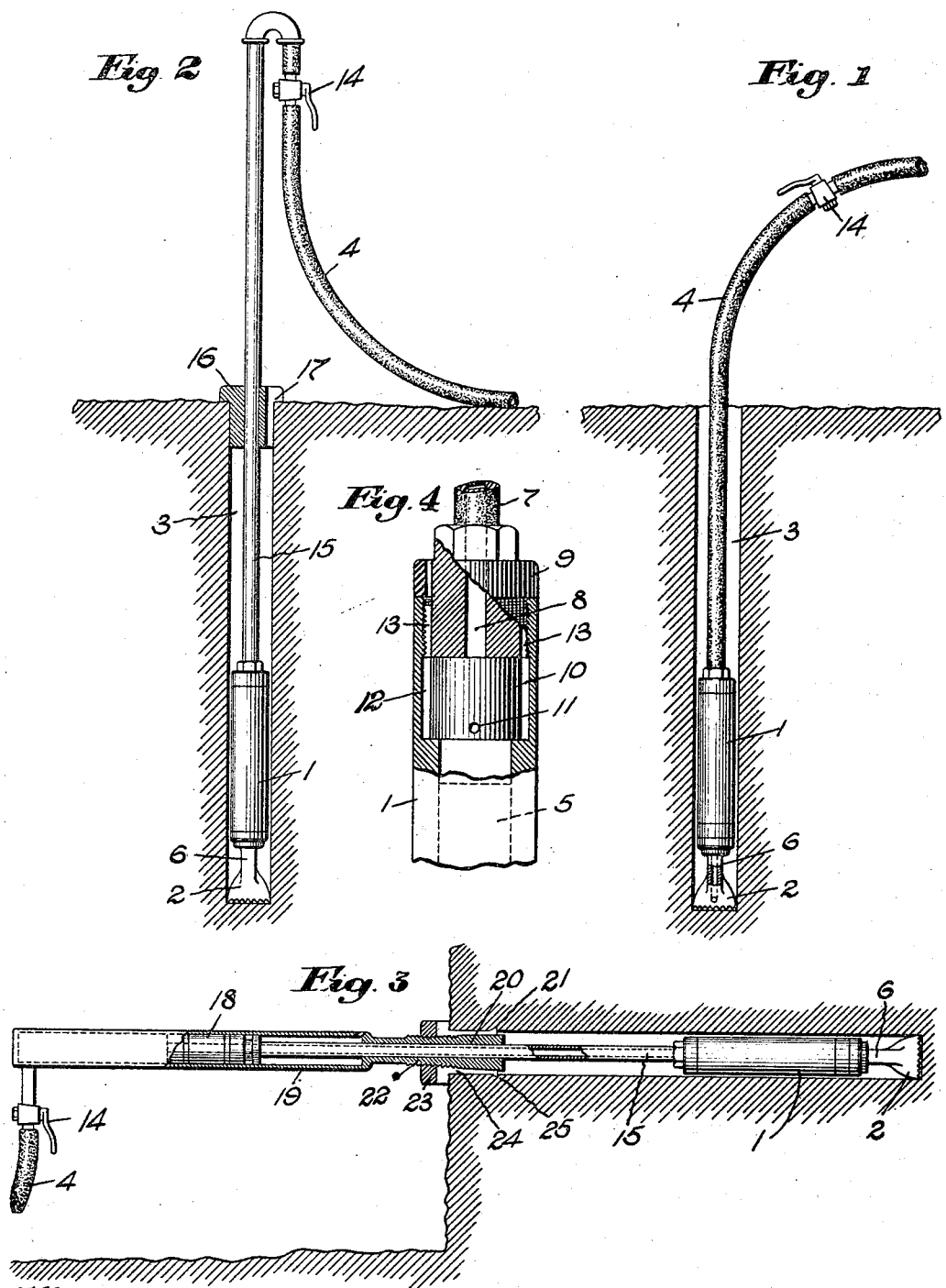

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

APPARATUS FOR DRILLING HOLES.

1,250,103.   Specification of Letters Patent.   Patented Dec. 11, 1917.

Application filed March 4, 1908. Serial No. 419,129.

*To all whom it may concern:*

Be it known that I, GEORGE H. GILMAN, a citizen of the United States, residing at Claremont, in the county of Sullivan and State of New Hampshire, have invented an Improvement in Apparatus for Drilling Holes, of which the following description, in connection with the accompanying drawings, is a specification, like letters on the drawings representing like parts.

My invention relates to apparatus for drilling holes, more particularly, though not necessarily exclusively, for quarrying or mining purposes.

In rock drilling it is the present practice to mount the drilling implement or tool adjacent the rock to be drilled, and as the hole deepens to feed the tool toward the rock for a limited distance. The drilling implement may be either a reciprocating drill with its cutter reciprocatively attached to the driving element, or an impact or hammer drill with its cutter adapted to rest against the stone while struck a succession of hammer blows. The feed of the tool toward the rock, however, is limited by the length of the cutter shank, and, when the tool has been fed in close approximation to the mouth of the hole, the cutter must be withdrawn and replaced by another having a longer shank to cut the hole deeper. In cutting deep holes cutters of excessively long shanks and of great weight and mass must be employed. If a reciprocatory drill is used, cutters of great length require tools of correspondingly greater power to lift them out of the cut. If an impact tool is used, the blows are delivered at an increasingly greater distance from the cutting edge and through an increasingly greater mass of steel, so that the effectiveness of the blows steadily diminish as the hole deepens.

My present invention contemplates the introduction of the cutting tool itself together with the cutter into and within the drilled hole, the tool with the cutter being fed or advanced within the hole as the latter deepens, thereby making it possible to actuate the cutter through the piston or other driven element of the tool in close and effective proximity to the working edges of the tool. This avoids the necessity of constantly changing cutters as the hole deepens to provide cutters of increasing length, thereby securing greater cutting efficiency which comes from the use of a shorter length of cutter, as well as securing other important advantages.

My invention will be best understood by reference to the following description when taken in connection with the accompanying illustration of one specific embodiment thereof, while its scope will be more particularly pointed out in the appended claim.

In the drawings:—

Figure 1 shows one application of my invention in a simplified aspect, to a drill tool of the pneumatic hammer type.

Fig. 2 is a modification of the application of the invention shown in Fig. 1, showing the employment of special guiding means for the tool.

Fig. 3 illustrates the preferred form of my invention, showing the employment of feeding means and the application of the invention to the drilling of horizontal or lateral holes; and Fig. 4 is a detail showing the arrangement of exhaust passages in the hammer drill.

Referring to the drawings and to the embodiment of my invention there shown in Fig. 1, the drill tool 1 is shown provided with the cutter 2, both introduced bodily within the drilled hole 3, and having no exterior attachment other than the flexible pipe 4 which is adapted to supply working pressure fluid from any suitable source (not shown) to the tool.

Any suitable form of drill may be employed either of the reciprocatory drill type or the impact hammer type, but in the illustrated embodiment of my invention I have shown a tool of the pneumatic impact hammer type. The detailed construction of the tool is of no particular consequence, as bearing on the broad principles of my invention, the construction of the tool shown, however, being substantially the same, except as to external form and the arrangement of the exhaust passages, as that shown in my prior U. S. Patent No. 853,921, dated May 14, 1907.

This tool is provided with a piston hammer or impact member 5 adapted to strike the head or upper end of the cutter shank 6, the piston being reciprocated under the influence of compressed air or other motive pressure fluid admitted through the flexible or other supply pipe, the latter preferably having an axial or central attachment to the upper end of the tool. Pressure fluid enters the tool through the supply passage 8 in the plug or cap piece 9 threaded into the tool cylinder 1 and passes to the valve block 10 where its admission to and exhaust from the cylinder is controlled by a suitably constructed distributing valve, such, for example, as is shown in my aforesaid prior patent.

While the tool may have any desired shape or form, preferably I give the same a barrel or cylinder-like formation of substantially uniform circular cross-section, so that it will not only be compact in size but will tend to guide and aline itself by contact with the sides of the drilled hole. The effective cutting diameter of the cutter should, however, preferably be greater than the greatest outside diameter of the tool, or, at any rate, of that portion of the tool which is intended to enter the drilled hole, so that the tool will offer no obstruction in its advance. The cutter may be as much wider than the tool as may be desired, although preferably, and particularly where no separate or additional guiding and alining means is employed, the cutter is slightly wider than the tool, as represented in Fig. 1, so that while the chippings and dust will have a reasonably free exit passage between the sides of the tool and the sides of the hole, the tool itself will be self-alining, or assist the alinement as the hole deepens.

Any suitable or desired means for clearing the bottom of the hole of chippings and dirt, either through the use of water or exhaust pressure fluid, or both, may be employed, but in the illustrated form of the invention I use the exhaust, the latter being emitted from the rear of the tool, so that it is directed toward the mouth of the hole. This produces a vacuum tending to draw the chippings out and discharge them at the mouth of the hole. To provide for this discharge of the exhaust, the exhaust opening 11 from the valve block communicates with the annular space 12 between the block and the cylinder walls, and with the rearwardly directed exhaust passages 13 formed in the walls of the plug or cap piece 9. In addition to the rearward discharge of the exhaust, a portion of the exhaust, or, if desired, the entire exhaust (the passages 13 being entirely or partly closed) may be discharged forwardly through the cutter bit, the latter having, for that purpose, an axial passage extending the entire length of the shank to the cutter edge (see Fig. 1).

In drilling a hole with the device shown in Fig. 1, the latter may be provided with a cutter or bit of any desired length of shank, but as shown in the drawings, its length may be reduced to a minimum, so that the effective blow of the hammer piston at all times is delivered in close and unchanging proximation to the cutting edge of the tool and the greatest cutting efficiency at all times maintained at the end of the cut, as well as at the commencement thereof, no matter how deep the hole.

In the form of the invention shown in Fig. 1, in starting the hole the tool may be held by hand or in any suitable guiding device, but as soon as the hole has deepened enough to receive the tool, or a portion thereof, the weight of the tool may be relied upon to hold the cutter in the bottom of the cut, and the contact between the barrel-like cylinder and the walls of the hole may be relied upon to guide the tool and keep the hole straight as the cut deepens. The motive fluid supplied to the tool may be controlled in any suitable manner and the operation of the tool started or stopped at will, as may be desired, as by means of the throttle valve 14 located in a section of the hose. If desired, the hose may be the sole external connection with the tool and alone may be utilized to introduce the tool into the hole or withdraw the same when the cut is finished, or at other times, such as when it is desired to sharpen the cutter bits.

Automatic rotating devices of any well known or usual type may be employed for the cutter, although, as shown, the cutter and tool will tend to execute a rotative or semi-rotative movement sufficient to shift the cutter about its axis between successive blows, thereby producing the desired rotative effect.

While in Fig. 1 I have shown the tool as provided with no independent tool-guiding devices, suitable tool guiding means, if desired, may be employed. For example, in Fig. 2, I have shown substantially the same form of tool 1, there being provided, however, between the flexible hose 4 and the tool a preferably rigid pipe or other connection 15 through which the motive fluid may be conveyed. This rigid rod or tubular attachment 15, projecting from the mouth of the hole, may be employed manually to guide or direct the tool as its cutting advances; or fixed guiding devices, such as the plug piece 16 fixedly held in the mouth of the hole, may be utilized for this purpose, the piece having a sliding and guided engagement within the plug. The plug piece 16 is shown apertured at 17 to permit the escape of the exhaust and the chippings.

The application of my invention is not confined or restricted to the drilling of vertical or other downwardly directed holes, but may be utilized to drill holes at any desired direction either horizontal, inclined or upwardly directed. For example, the tool may be manually forced to follow the cutter.

into the hole by using an attachment, such as the rigid attachment 15 shown in Fig. 2, or automatic pressure fluid or other feeding devices may be employed to hold the tool to the work and cause the tool with its attachment automatically to enter or advance within the hole.

In Fig. 3 I have shown a cutting tool 1 and cutter 2 similar to that shown in Fig. 2, and an attached rigid tubular supply connection 15, all coöperating to drill a horizontal hole. There are here provided, however, coöperating fluid pressure cylinder and piston feeding elements for the automatic advance of the tool, the piston 18 being connected to the tool rod 15 and adapted to slide within the cylinder 19, the latter held rigidly fixed at the mouth of the hole. Pressure fluid being admitted through the flexible connection 4 under the control of the throttle valve 14 to the outer end of the feeding cylinder, the feeding piston 18 with its attached tubular rod and tool, is forced forward into the drilled hole under the full supplied working pressure. At the same time, the pressure fluid admitted to the feeding cylinder passes through an axial passage in the piston 18 and through the tubular rod 15 to supply the tool, causing the simultaneous operation thereof. The feeding cylinder may be held up toward the mouth of the hole to receive the backward thrust of the tool by any suitable means. In the illustrated form, the forward end of the cylinder is provided with an elongated bearing part 20 with which the rod 15 has sliding engagement, the outer portion of the part 20 being tapered at 21 and threaded at 22. The tapered portion may be drawn tightly by the lock nut 23 into a seat formed in the split encircling anchor 24, the latter being firmly anchored into the sides of the hole by means of the points 25.

My invention is not limited to the employment of any particular form of motive fluid or driving power, nor is the same limited to the employment alone of an impact drill member as distinct from a reciprocatory drill. Where a reciprocatory drill is employed, however, preferably some means should be provided apart from the mere rest of the cutter upon the bottom of the hole for holding the tool in fixed relation to the bottom thereof.

My invention is not limited to the particular form of apparatus herein shown or to the precise steps described in carrying it into effect, but is susceptible of various applications and embodiments quite different and remote from those herein described, but which are comprehended within the scope of the claim.

Claim:

In a device for drilling rock, the combination with a fluid operated drill tool, of a cutter having an edge of greater width than the outside dimension of said tool, means for discharging a portion of the exhaust fluid in a rearward direction from the rear end of said tool, and means for discharging another portion thereof through the cutter at or adjacent the cutting edge thereof.

In testimony whereof, I have signed my name to this specification in the presence of two subscribing witnesses.

GEORGE H. GILMAN.

Witnesses:
J. A. BRUCE,
E. J. BRUCHARD.

Copies of this patent may be obtained for five cents each, by addressing the "Commissioner of Patents, Washington, D. C."